(12) United States Patent
Miyashiro et al.

(10) Patent No.: US 8,104,565 B2
(45) Date of Patent: Jan. 31, 2012

(54) BODY FRAME AND VEHICLE

(75) Inventors: Shidehiko Miyashiro, Shizuoka (JP); Toshio Okamoto, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 342 days.

(21) Appl. No.: 11/940,148

(22) Filed: Nov. 14, 2007

(65) Prior Publication Data

US 2008/0110688 A1 May 15, 2008

(30) Foreign Application Priority Data

Nov. 15, 2006 (JP) ................................. 2006-308757
Oct. 19, 2007 (JP) ................................. 2007-272716

(51) Int. Cl.
*B62K 11/04* (2006.01)
(52) U.S. Cl. ..... 180/311; 180/312; 180/219; 280/281.1; 280/276; 280/781
(58) Field of Classification Search .................. 180/219, 180/220, 225, 311, 312; 280/281.1, 791, 280/274, 276, 781
See application file for complete search history.

(56) References Cited

U.S. PATENT DOCUMENTS

| | | | | |
|---|---|---|---|---|
| 4,226,296 A * | 10/1980 | Higaki | | 180/219 |
| 4,461,366 A | 7/1984 | Honda | | |
| 4,660,854 A * | 4/1987 | Suzuki et al. | | 280/782 |
| 5,704,442 A * | 1/1998 | Okazaki et al. | | 180/219 |
| 5,845,728 A * | 12/1998 | Itoh et al. | | 180/219 |
| 5,921,339 A * | 7/1999 | Matsuura | | 180/219 |
| 6,186,550 B1 * | 2/2001 | Horii et al. | | 280/833 |
| 6,446,996 B1 * | 9/2002 | Horii | | 280/281.1 |
| 6,481,522 B1 * | 11/2002 | Adachi | | 180/219 |
| 7,201,246 B2 * | 4/2007 | Brendelson et al. | | 180/228 |
| 7,232,142 B2 * | 6/2007 | Kudo | | 280/274 |
| 7,270,210 B2 * | 9/2007 | Katsura | | 180/219 |
| 7,296,814 B2 * | 11/2007 | Miyamoto | | 280/281.1 |
| 7,360,619 B2 * | 4/2008 | Adachi et al. | | 180/219 |
| 7,490,689 B2 * | 2/2009 | Seki et al. | | 180/229 |
| 7,571,714 B2 * | 8/2009 | Miyashiro | | 123/470 |
| 7,766,119 B2 * | 8/2010 | Yokoi et al. | | 180/311 |
| 2004/0206566 A1 * | 10/2004 | Katsura | | 180/219 |
| 2005/0247500 A1 * | 11/2005 | Miyamoto | | 180/219 |
| 2006/0065462 A1 * | 3/2006 | Ishida et al. | | 180/227 |
| 2006/0076175 A1 * | 4/2006 | Yamakura et al. | | 180/219 |
| 2006/0157955 A1 * | 7/2006 | Kurokawa et al. | | 280/279 |

(Continued)

FOREIGN PATENT DOCUMENTS
EP  1462351 A2  9/2004
(Continued)

OTHER PUBLICATIONS

Komatsu et al., Body Frame for Motorcycle, Jan. 10, 1990, JPO, JP 2-6286 A, English Abstract.*

(Continued)

*Primary Examiner* — Ruth Ilan
*Assistant Examiner* — James English
(74) *Attorney, Agent, or Firm* — Keating & Bennett, LLP (57) ABSTRACT

A body frame for a vehicle such as a motorcycle with a minimized number of parts. A main frame is connected to a head pipe and supports a rear arm to which a rear wheel is attached. A tank rail is connected to the head pipe at one end and to the main frame at the other end.

18 Claims, 10 Drawing Sheets

U.S. PATENT DOCUMENTS

| | | | |
|---|---|---|---|
| 2006/0197304 A1* | 9/2006 | Ishikawa et al. | 280/281.1 |
| 2007/0018420 A1* | 1/2007 | Hoshi | 280/274 |
| 2008/0110687 A1* | 5/2008 | Miyashiro et al. | 180/296 |
| 2008/0184954 A1* | 8/2008 | Yokoi et al. | 123/184.53 |
| 2011/0192669 A1* | 8/2011 | Yokoi et al. | 180/219 |

FOREIGN PATENT DOCUMENTS

| | | | |
|---|---|---|---|
| EP | 1580108 A2 | | 9/2005 |
| EP | 1681229 A2 * | | 7/2006 |
| JP | 61184188 A | | 8/1986 |
| JP | 02006286 A | * | 1/1990 |
| JP | 2001-278158 | | 10/2001 |

OTHER PUBLICATIONS

European Search Report for corresponding European application 07022226.0, Mar. 5, 2008.

* cited by examiner

BODY FRAME AND VEHICLE

RELATED APPLICATIONS

This application claims the benefit of priority under 35 USC 119 of Japanese patent application nos. 2006-308757, filed on Nov. 15, 2006, and 2007-272716, filed on Oct. 19, 2007, which applications are hereby incorporated by reference in their entireties.

BACKGROUND OF THE INVENTION

1. Field of the Invention

The present invention relates to a body frame of a vehicle, and in particular to a body frame including a head pipe.

2. Description of Related Art

Conventionally, a body frame including a head pipe has been known. In JP-A-2001-278158, for example, a body frame is disclosed. The body frame includes a head pipe, pivot plates supporting a rear swing arm (rear arm) to which a rear wheel is attached, a main frame connecting between the head pipe and the pivot plates and supporting a fuel tank, a down tube attached to a lower portion of the head pipe, a gusset (reinforcing plate) connecting the down tube with the main frame, a tension pipe and a mounting stay, and a lower frame joining a lower portion of the down tube with a lower portion of the pivot plate. The body frame includes a gusset (reinforcing plate), and the tension pipe and the mounting stay to strengthen the connection between the head pipe and the main frame. The gusset connects the down tube attached to the lower portion of the head pipe with the main frame.

However, according to the structure disclosed in JP-A-2001-278158, the body frame includes the main frame join the pivot plate supporting the rear swing arm, to which the rear wheel is attached, and the head pipe. In addition, to secure the connection between the head pipe and the main frame, the body frame includes the gusset (reinforcing plate), the tension pipe, and the attaching stay. The gusset connects the main frame to the down tube attached to the head pipe. This structure is disadvantageous in that the number of parts of the body frame is increased.

SUMMARY OF THE INVENTION

The present invention has been conceived to solve this problem, and provides a body frame without an increased number of parts.

A first aspect of the invention is a body frame including a head pipe; a first frame connected to the head pipe and supporting a rear arm to which a rear wheel is attached; and a second frame connected at one end to the head pipe and at the other end to the first frame.

According to the first aspect, connecting the first frame that supports the rear arm to which the rear wheel is attached to the head pipe, and providing the second frame, secures the connection between the head pipe and the first frame. Accordingly, the number of parts of the body frame is minimized and the connection between the first frame that supports the rear arm and the head pipe is secured.

In one embodiment, the first frame is directly connected to the head pipe, which further minimizes the number of parts of the body frame.

In another embodiment, where the first frame is directly connected to the head pipe, the head pipe extends rearward and includes a frame fixing portion at which the first frame is connected to the head pipe. The first frame is thereby easily and directly connected to the head pipe at the frame fixing portion.

In another embodiment, a boss for supporting an engine is formed integrally on the first frame. The number of parts required for supporting the engine is thereby minimized relative to configurations in which a boss for supporting the engine is formed separately from the first frame.

In another embodiment, the head pipe has an insertion hole, into which a steering shaft is to be inserted, and a first recess with a depth extending in the same direction as the insertion hole. When the head pipe is formed in a cavity die by semi-solid die casting, for example, the direction in which the cavity die is pulled out is aligned to the direction along which the insertion hole extends, thereby permitting the head pipe having the recess therein to be easily formed.

In another embodiment, one end of the second frame is connected to a portion of the head pipe that is higher than a portion of the head pipe to which the first frame is connected. The second frame can thereby be a spring element and can be changed in accordance with the vehicle. In this case, when the second frame is formed by forging, the cross-sectional shape of the second frame can be changed inexpensively and easily.

In another embodiment, one end of the second frame is connected to a portion of the head pipe that is lower than a portion of the head pipe to which the first frame is connected. This configuration reinforces the relation between the first frame and the lower part of the head pipe, and improves the rigidity of the first frame.

In another embodiment, another end of the second frame is connected to an upper portion of the head pipe. The second frame can thereby be a spring element and can be changed in accordance with the vehicle. In this case, when the second frame is formed by forging, the cross-sectional shape of the second frame can be changed inexpensively and easily.

In another embodiment, another end of the second frame is connected to a lower portion of the head pipe. This reinforces the relation between the first frame and the lower part of the head pipe and improves the rigidity of the first frame.

In another embodiment, at least one of the head pipe and the first frame has a C-shaped cross section. This improves flexibility in the shape of the head pipe and the first frame, thereby allowing easy manufacture by die casting, forging or the like.

In another embodiment, the first frame comprises a pair of frames that extend rearward with a predetermined spacing therebetween and approach each other toward the head pipe. The pair of frames can thereby be arranged in a V-shape or a U-shape and intersect each other at a predetermined angle to the head pipe, thereby increasing the horizontal rigidity of the body frame.

In another embodiment, the first frame includes a connecting part to be connected to the second frame by being pinched thereby. The connecting part has a second recess inside a portion at which the connecting part is pinched by the second frame. This configuration reduces the weight of the first frame.

In another embodiment, at least one of the head pipe and the first frame is formed by semi-solid die casting. This reduces the size and weight of the first frame and the head pipe relative to those formed by forging or conventional casting. Forging is less flexible in shape and less accurate than semi-solid die casting. If the first frame and the head pipe were formed by forging, they would need a larger thickness in order to be formed into a recess (C-shape) or a shape to secure a predetermined strength, which would increase the size and weight of the first frame and the head pipe. And, a product formed by conventional casting is less strong than a product formed by semi-solid die casting. Hence, if the first frame and the head pipe were formed by conventional casting, the thickness of the first frame and the head pipe would need to be increased to secure a predetermined strength, which would increase the size and weight of the first frame and the head pipe.

A second aspect of the invention is a vehicle including a rear wheel; a rear arm to which the rear wheel is attached; a head pipe; a first frame connected to the head pipe and supporting the rear arm; and a second frame connected at one end to the head pipe and at the other end to the first frame.

According to the second aspect, by connecting the first frame that supports the rear arm to the head pipe, and providing a second frame, the connection between the head pipe and the first frame is secured. The number of parts of the body frame is thereby minimized while the connection between the first frame and the head pipe is secured.

In one embodiment, a fuel tank supported by the second frame is provided. The fuel tank is thereby supported by utilizing a connecting part between the head pipe and the first frame.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the present invention are now described with reference to the drawings.

First Embodiment

Figure 1:
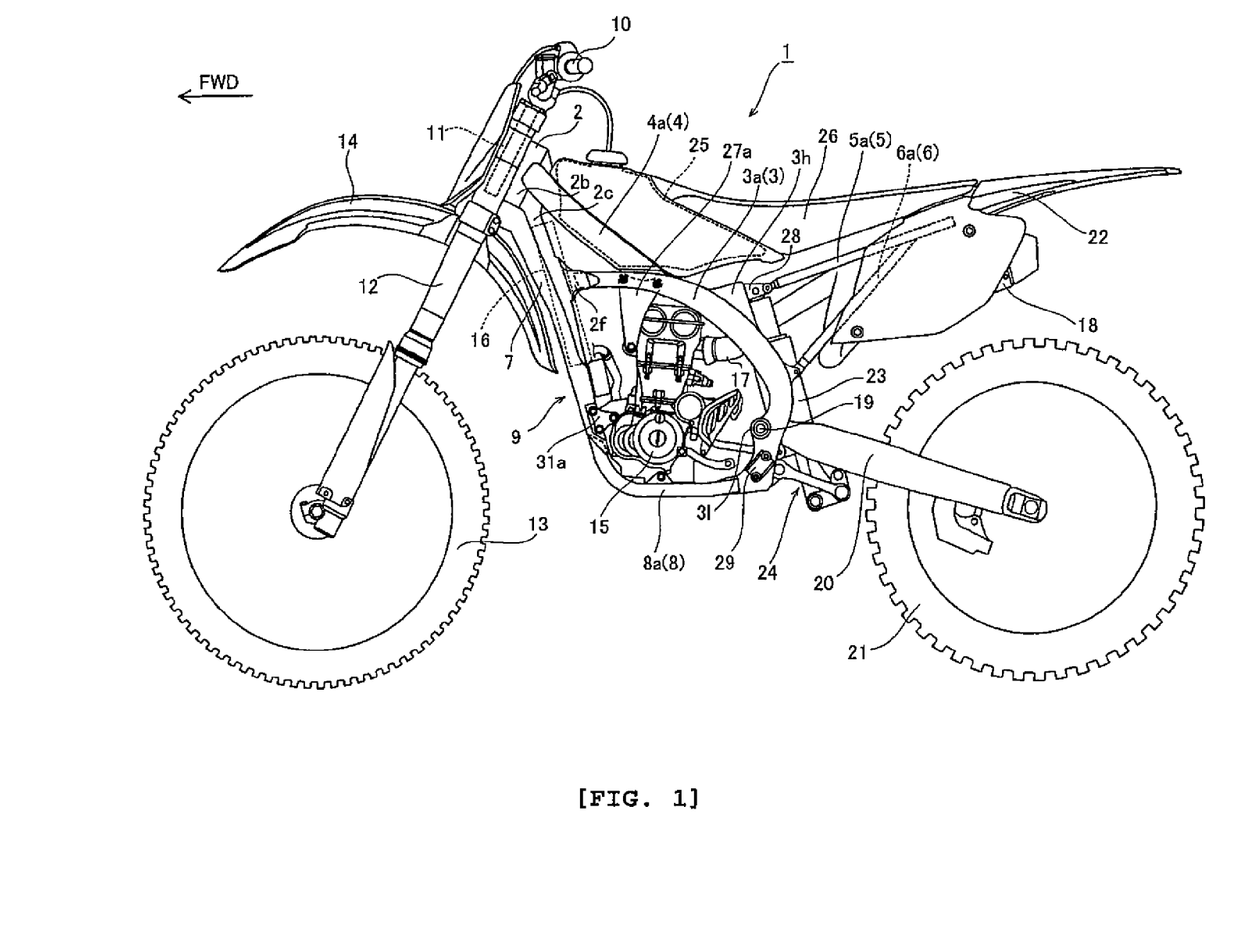
FIG. 1 is a side view of a motorcycle according to an embodiment of the present invention.

FIG. 1 is a side view of a motorcycle 1 according to a first embodiment of the present invention. FIGS. 2-11 are explanatory views of a body frame of motorcycle 1. A motorcycle is merely one example of a vehicle according to the present invention. The direction indicated by the arrow FWD in the drawings is a forward traveling direction of motorcycle 1. The structure of motorcycle 1 according to the first embodiment of the invention is now described with reference to FIGS. 1-11.

Motorcycle 1 has a main frame 3 of which a front end is directly connected to a head pipe 2. Main frame 3 extends in a downwardly rearward direction. Main frame 3 is an example of the "first frame" of the present invention.

Figure 2:
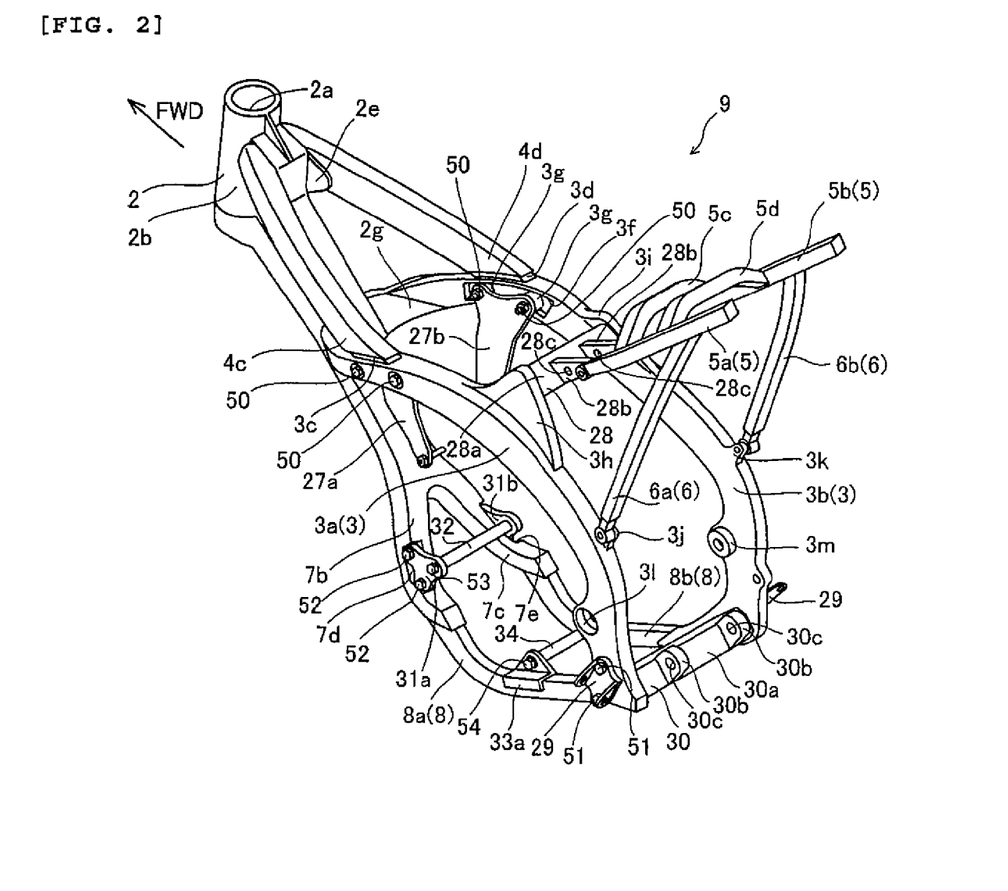
FIG. 2 is a perspective view of a body frame of the motorcycle of FIG. 1.

A tank rail 4 is interposed between a rear portion of head pipe 2 and an upper portion of main frame 3. More specifically, a front end (one end) of tank rail 4 is connected to the rear portion of head pipe 2, and a rear end (other end) of tank rail 4 is connected to the upper portion of main frame 3. Tank rail 4 is an example of the "second frame" of the present invention. A seat rail 5 extending in an upwardly rearward direction is connected to main frame 3. A backstay 6 is connected between a rear end of main frame 3 and a rear portion of seat rail 5. A down tube 7 is disposed under head pipe 2. A lower frame 8 connecting down tube 7 and the lower end of main frame 3 is provided at a lower end of down tube 7. Head pipe 2, main frame 3, tank rail 4, seat rail 5, backstay 6, down tube 7 and lower frame 8 form a body frame 9. The structure of body frame 9 is described in detail later.

A handlebar 10 is pivotally disposed on the top of head pipe 2. A steering shaft 11, which is inserted in insertion hole 2a (FIG. 2) of head pipe 2, is attached to the bottom of handlebar 10. A pair of front forks 12 are disposed below head pipe 2. A front wheel 13 is rotatably attached to lower ends of the pair of front forks 12. A front fender 14 is disposed above and covers an upper part of front wheel 13.

An engine 15 is disposed below main frame 3. A radiator 16 for cooling engine 15 is disposed at a position upward and forward of engine 15. An exhaust pipe 17 is connected to a rear portion of engine 15. Exhaust pipe 17 extends rearward to be connected to a muffler 18.

A pivot shaft 19 provided through main frame 3 supports the front end of rear arm 20 for vertical pivotal movement. A rear wheel 21 is rotatably attached to the rear end of rear arm 20. A front fender 22 is disposed above and covers an upper part of front wheel 21.

A rear suspension 23 disposed at a rear portion of main frame 3 is connected to rear arm 20 via a coupling member 24 to absorb shock caused by vertical pivotal movement of rear arm 20.

A fuel tank 25 made of a resin is disposed on tank rail 4. Fuel tank 25 is sandwiched between a left tank rail 4a and a right tank rail 4b (see FIG. 2) of tank rail 4. A seat 26 is disposed to the rear of fuel tank 25.

The structure of body frame 9 is described in detail below.

Figure 6:
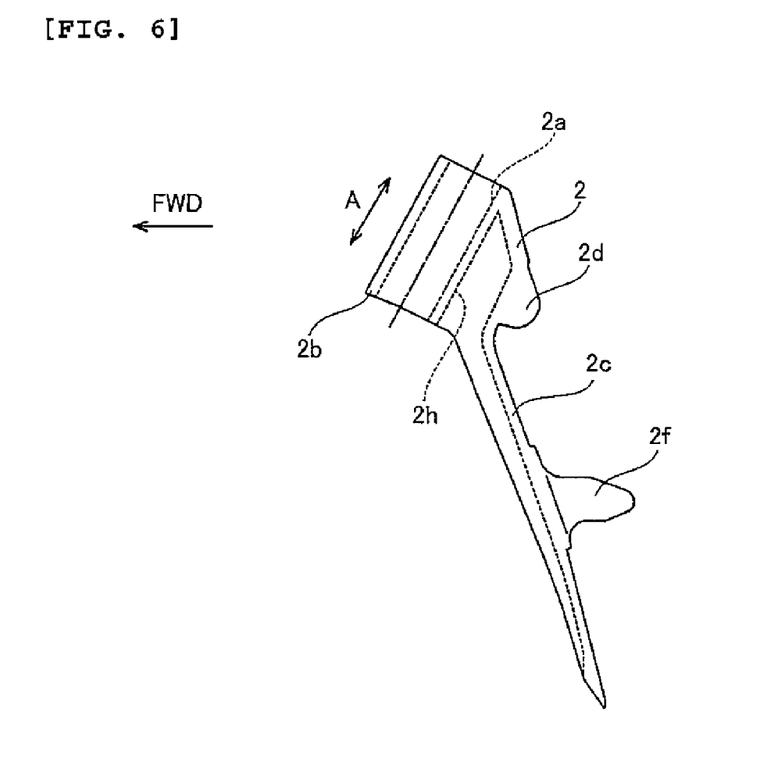
FIG. 6 is a side view of a head pipe of the motorcycle of FIG. 1.

Head pipe 2 is formed of aluminum by semi-solid diecasting. Semi-solid die casting is one method of die casting metal that is a mixture of a liquid and solid phase. The semi-solid die casting process improves flexibility in shape and accuracy as compared with forging, and increases the strength of a casting as compared with that obtained by common die casting. As shown in FIG. 6, head pipe 2 includes a cylindrical section 2b and a body section 2c. Insertion hole 2a extending in a predetermined direction (direction A) is defined through cylindrical section 2b. Body section 2c extends downward from the rear of cylindrical section 2b.

Weld reinforcements 2d (FIG. 6) and 2e (FIG. 2), protruding, respectively, in a leftward and rearward direction and a rightward and rearward direction, are provided on body section 2c of head pipe 2 at positions behind cylindrical section 2b. In this description, the left and right directions are from the perspective of a rider facing the forward traveling direction (the direction indicated by arrow FWD). Weld parts 2f (FIG. 6) and 2g (FIG. 2) protruding, respectively, in a leftward and rearward direction and a rightward and rearward direction, are provided on head pipe 2 at positions lower than weld reinforcements 2d and 2e. Weld parts 2f and 2g are examples of the "frame fixing portion" of the present invention.

Head pipe 2 is formed by semi-solid die casting, thereby making it possible to easily form head pipe 2 integrally with weld reinforcements 2d and 2e and weld parts 2f and 2g.

Figure 7:
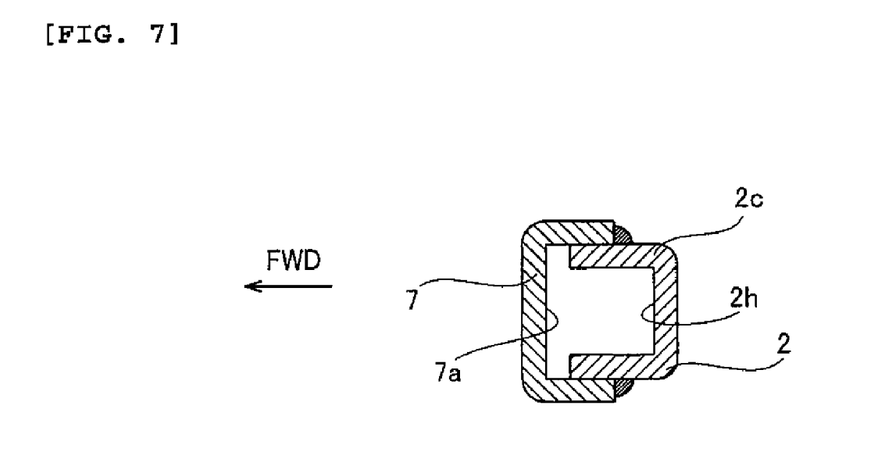
FIG. 7 is a sectional view taken along line 100-100 of FIG. 4.

A recess 2h is defined in a front surface of body section 2c (FIG. 6). The depth of recess 2h extends in the same direction (direction A) as insertion hole 2a. As shown in FIG. 7, body section 2c has a C-shaped cross section. Recess 2h is an example of the "first recess" of the present invention.

Figure 3:
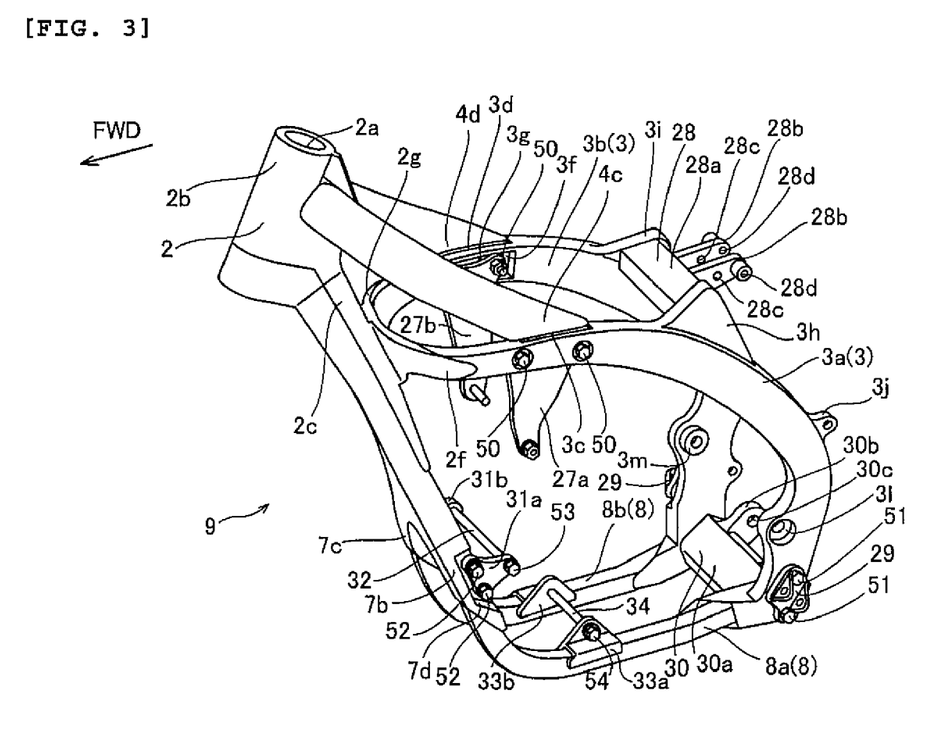
FIG. 3 is a perspective view of a main frame and its surroundings of the motorcycle of FIG. 1.

Main frame 3 is formed of aluminum by semi-solid die-casting. As shown in FIGS. 2 and 3, main frame 3 is formed by a left frame 3a and a right frame 3b.

Figure 5:
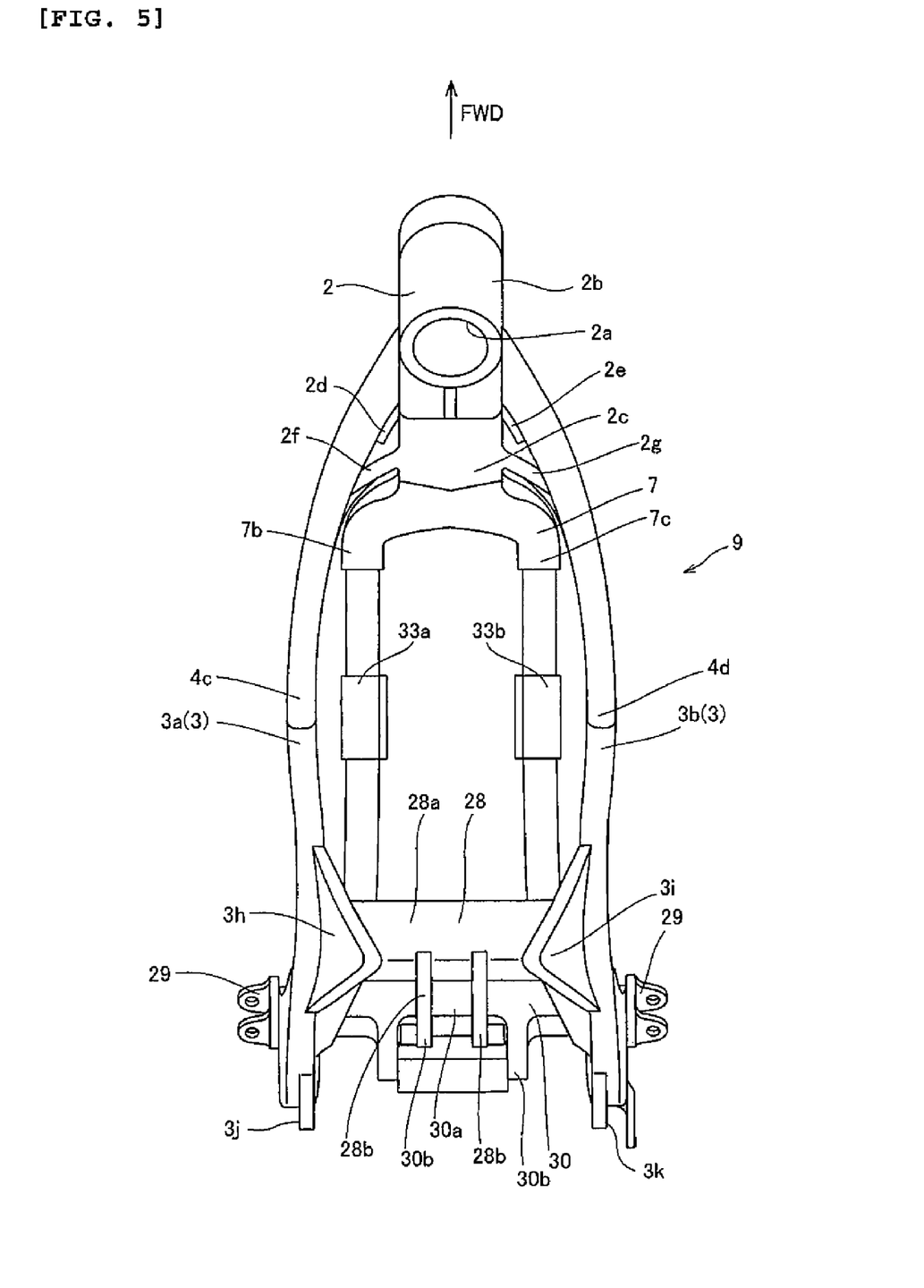
FIG. 5 is a plan view of the main frame and its surroundings of the motorcycle of FIG. 1.

As shown in FIGS. 2 and 5, left and right frames 3a and 3b extend rearward and have a predetermined spacing therebetween in a widthwise direction of the vehicle body in plan view. Front ends of left and right frames 3a and 3b are welded, respectively, to weld parts 2f and 2g of head pipe body section 2c. More specifically, left and right frames 3a and 3b are arranged to assume a U-shape and approach each other toward body section 2c of head pipe 2.

Figure 4:
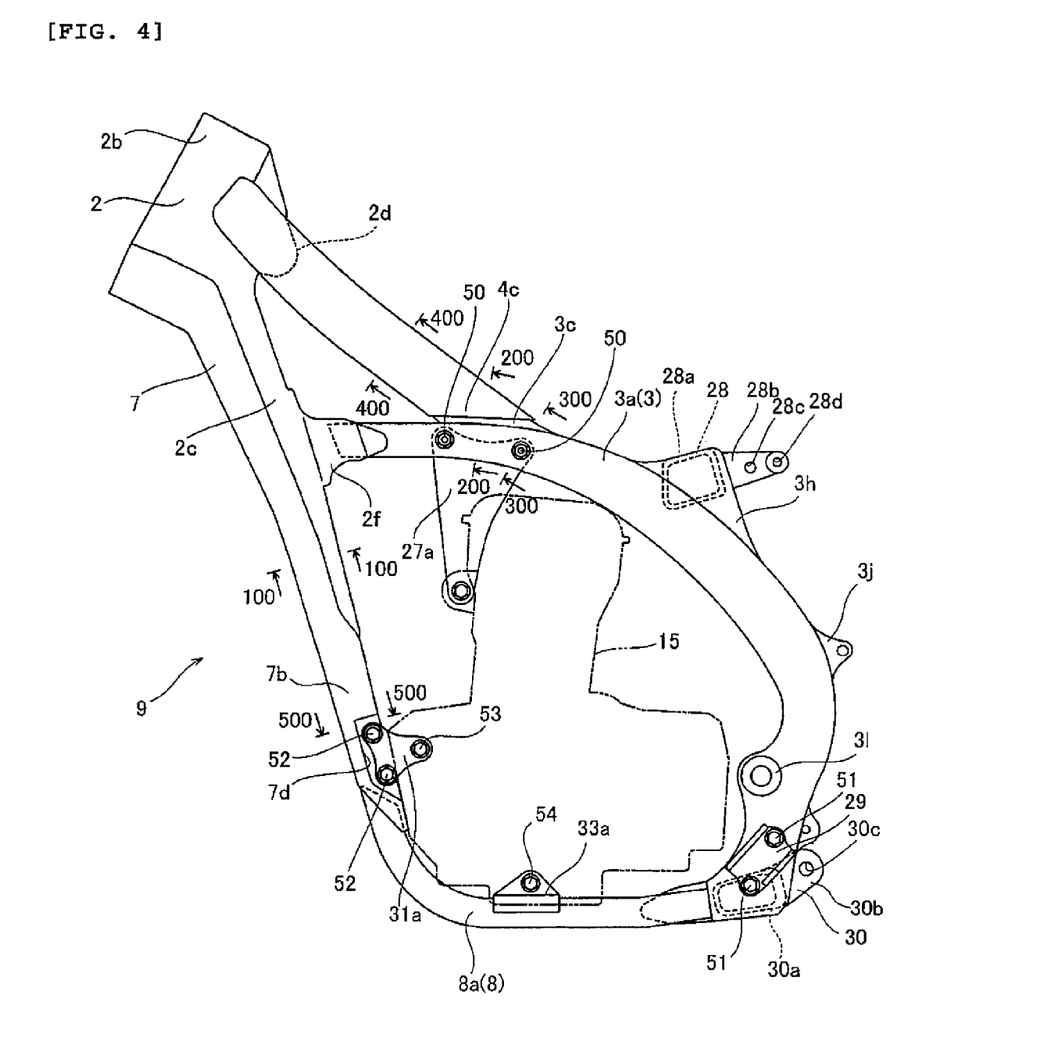
FIG. 4 is a side view of the main frame and its surroundings of the motorcycle of FIG. 1.
Figure 8:
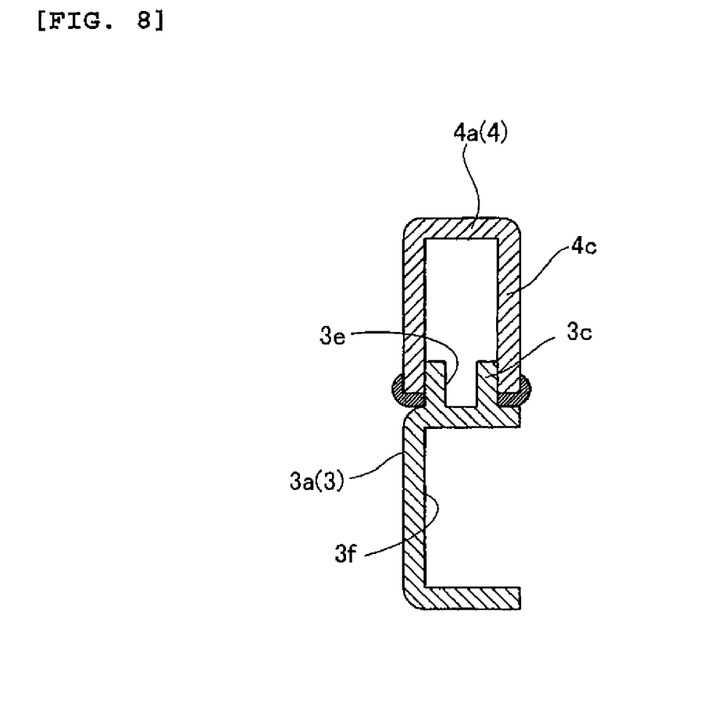
FIG. 8 is a sectional view taken along line 200-200 of FIG. 4.

As shown in FIGS. 2 and 4, connecting parts 3c and 3d, to which tank rail 4 is to be welded, are formed on upper parts of left and right frames 3a and 3b. Connecting parts 3c and 3d are examples of the "connecting part" of the present invention. As shown in FIG. 8, connecting parts 3c and 3d are welded such that connecting parts 3c and 3d are pinched between connecting parts 4c and 4d of tank rail 4 to thus be fitted therein. A recess 3e is defined in an inner surface of each of welding portions 3c and 3d at a position into which a corresponding one of connecting parts 4c and 4d of tank rail 4 is to be fitted. Recess 3e is an example of the "second recess" of the present invention.

Figure 9:
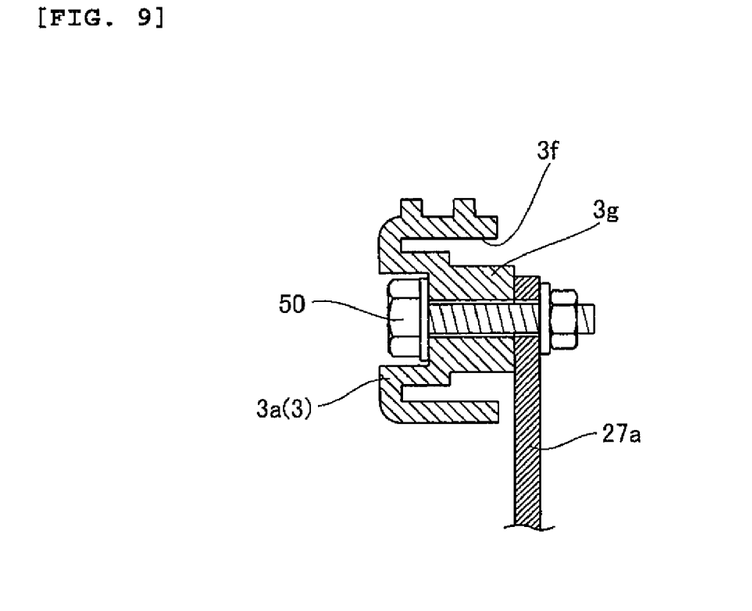
FIG. 9 is a sectional view taken along line 300-300 of FIG. 4.

As shown in FIGS. 2 and 9, a portion of each of left frame 3a and right frame 3b, near to which tank rail 4 is welded includes a C-shaped cross section having recess 3f therein. A boss 3g is formed integrally on an inside of recess 3f. Support plates 27a and 27b supporting engine 15 (FIG. 4) are fixed to bosses 3g with screws 50.

Main frame 3 is thus formed by semi-solid die casting, and is thereby easily formed integrally with recesses 3e and bosses 3g.

As shown in FIG. 2, bracket welding portions 3h and 3i are formed integrally on left and right frames 3a and 3b, respectively, at their longitudinal centers. As shown in FIG. 5. bracket welding portions 3h and 3i extend in an upwardly inward direction. As shown in FIGS. 2 and 3, a rear suspension bracket 28 that supports an upper portion of rear suspension 23 (FIG. 1) is welded to bracket welding portions 3h and 3i. Rear suspension bracket 28 includes a cross pipe 28a formed by extrusion and two mounting parts 28b formed integrally with cross pipe 28a. A rear-suspension support hole 28c and a seat-rail support hole 28d are defined in each of mounting parts 28b.

Mounting parts 3j and 3k (FIG. 2), to which backstay 6 is attached, are formed, respectively, on left and right frames 3a and 3b at positions rearward of bracket welding portions 3h and 3i.

Fixing parts 3l and 3m for fixing pivot shaft 19 (FIG. 1) are formed, respectively, in the lower portions of left and right frames 3a and 3b. A footrest holding plate 29 is fixed to left and right frames 3a and 3b at a position lower than fixing parts 3l and 3m with a screw 51.

Coupling member brackets 30 for attaching coupling members 24 (FIG. 1) are welded to left and right frames 3a and 3b at their lower ends. Each coupling member bracket 30 includes a cross pipe 30a formed by extrusion and two mounting parts 30b formed integrally with cross pipe 30a. A coupling-member support hole 30c is defined in each mounting part 30b. As shown in FIGS. 3 and 5, front portions of the lower ends of left and right frames 3a and 3b are curved inward toward the front.

Figure 10:
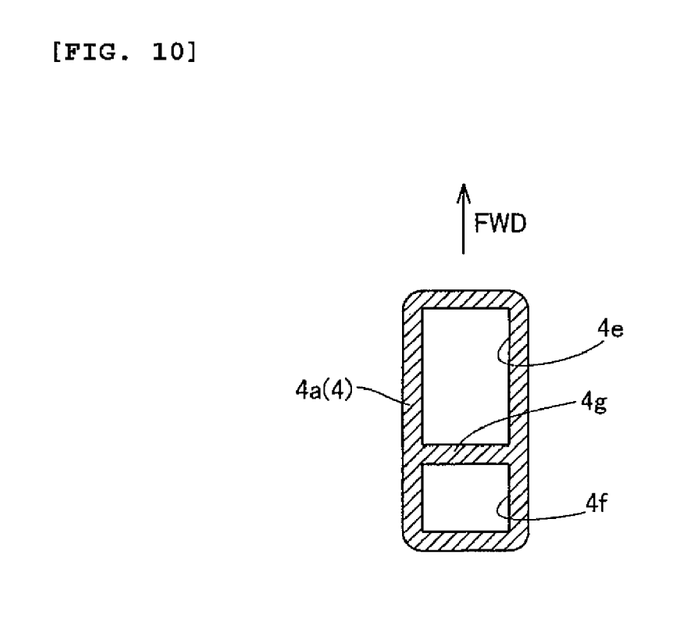
FIG. 10 is a sectional view taken along line 400-400 of FIG. 4.

Tank rail 4 is formed of aluminum by extrusion and comprises a left tank rail 4a and a right tank rail 4b. As shown in FIG. 10, tank rail 4 has, in cross section, two holes 4e and 4f partitioned by a wall 4g. Alternatively, tank rail 4 may have a rectangular cross section with a single hole and no wall. As shown in FIG. 2, a front end of left tank rail 4a is welded to head pipe 2 at an upper left portion of body section 2c and at weld reinforcement 2d (FIG. 5). Connecting part 4c on the rear end of left tank rail 4a is welded to connecting part 3c of left frame 3a. Similarly, a front end of right tank rail 4b is welded to head pipe 2 at an upper right portion of body section 2c and at weld reinforcement 2e, and connecting part 4d on the rear end of right tank rail 4b is welded to connecting part 3d of left frame 3b.

Seat rail 5 comprises a left rail 5a and a right rail 5b connected by two reinforcing pipes 5c and 5d. Front ends of left and right rails 5a and 5b are fixed in seat-rail support holes 28d (FIG. 3) in mounting part 28b of rear suspension bracket 28.

Backstay 6 comprises a left stay 6a and a right stay 6b. Upper ends of left and right stays 6a and 6b are welded to left and right rails 5a and 5b. Lower ends of the left and right stays are attached to mounting part 3j on left frame 3a and mounting part 3k on right frame 3b.

Down tube 7 is formed of aluminum by forging and is welded at its rear surface to head pipe 2 (FIG. 4). As shown in FIG. 7, a portion of down tube 7 welded to head pipe 2 includes a C-shaped cross section having recess 7a therein.

Figure 11:
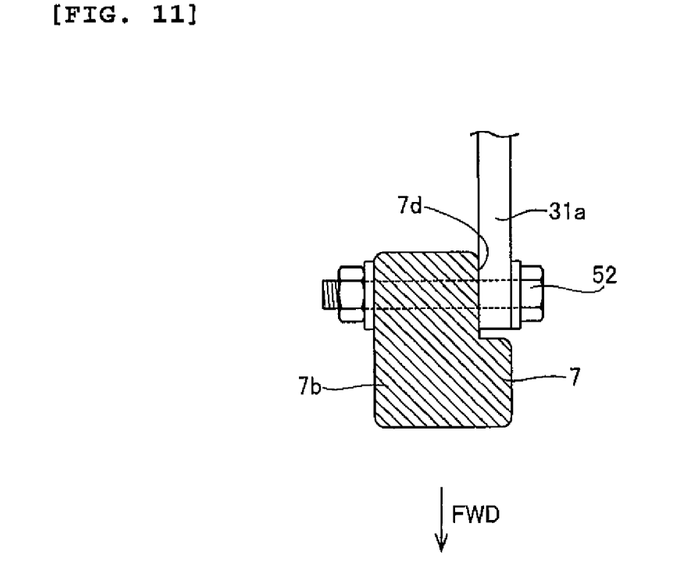
FIG. 11 is a sectional view taken along line 500-500 of FIG. 4.

As shown in FIG. 2, a lower portion of down tube 7 is bifurcated into a left tube 7b extending in a downwardly leftward direction and a right tube 7c extending in a downwardly rightward direction. Recesses 7d and 7e are formed, respectively, in left and right tubes 7b and 7c. As shown in FIG. 11, support plates 31a and 31b are fixed in recesses 7d and 7e with screws 52. As shown in FIG. 2, a support bar 32 supporting engine 15 (FIG. 4) is fixed to support plates 31a and 31b with screws 53.

Lower frame 8 is formed of aluminum by extrusion and comprises a left lower frame 8a and a right lower frame 8b. Front ends of left lower and right lower frames 8a and 8b are welded, respectively, to lower ends of left and right tubes 7b and 7c. Support plates 33a and 33b are welded, respectively, to top surfaces of left and right lower frames 8a and 8b. A support bar 34 supporting engine 15 is fixed to support plates 33a and 33b with screws 54. Rear ends of left lower and right lower frames 8a and 8b are welded, respectively, to front portions of lower ends of left and right frames 3a and 3b.

In the first embodiment, as described above, body frame 9 includes main frame 3 directly connected to head pipe 2 and supporting rear arm 20 to which rear wheel 21 is attached, and tank rail 4 connected to head pipe 2 at its front end and to main frame 3 at its rear end. According to this configuration, main frame 3 supporting rear arm 20, to which rear wheel 21 is attached, is connected to head pipe 2, and tank rail 4 secures the connection between head pipe 2 and main frame 3. This secures the connection between main frame 3 supporting rear arm 20, to which rear wheel 21 is attached, and head pipe 2, without increasing the number of parts of body frame 9.

In the first embodiment, head pipe 2 extends rearward and includes weld parts 2f and 2g at which main frame 3 is connected to head pipe 2. Main frame 3 is thereby easily and directly connected to head pipe 2 at weld parts 2f and 2g.

In the first embodiment, boss 3g for supporting engine 15 is formed integrally on main frame 3. Hence, there is no increase in the number of parts required for supporting engine 15 as compared with configurations in which boss 3g for supporting engine 15 is formed separately from main frame 3.

In the first embodiment, insertion hole 2a, into which steering shaft 11 is to be inserted, and recess 2h having a depth extending in the same direction (A) as insertion hole 2a are defined in head pipe 2. This configuration allows, during a process of forming head pipe 2 in a cavity die by semi-solid die casting, aligning a direction in which the cavity die is pulled out to the direction along which insertion hole 2a extends, thereby allowing head pipe 2 having recess 2h therein to be easily formed.

In the first embodiment, left frame 3a and right frame 3b of main frame 3 are arranged to extend rearward and to have a predetermined spacing therebetween, and to form a U-shape and approach each other toward body section 2c of head pipe 2. This arrangement increases the horizontal rigidity of body frame 9.

In the first embodiment, recess 3e is defined in inner surfaces of connecting parts 3c and 3d at the positions into which tank rail 4 is to be fitted, thereby reducing the weight of main frame 3.

In the first embodiment, main frame 3 and head pipe 2 are formed by semi-solid die-casting. This reduces the size and weight of main frame 3 and head pipe 2 relative to those formed by forging or common die-casting. With respect to forging, forging is less flexible in shape and less accurate than semi-solid die casting. If main frame 3 and head pipe 2 were formed by forging, each of main frame 3 and head pipe 2 would need a larger thickness in order to be formed into a recess (C-shape) or a shape with which a predetermined strength can be secured, which would increase the size and weight of main frame 3 and head pipe 2. With respect to common die-casting, a product formed by common die-casting is less strong than a product formed by semi-solid die-casting. If main frame 3 and head pipe 2 were formed by common die casting, main frame 3 and head pipe 2 would need increased thickness to secure a predetermined strength, thereby increasing their size and weight.

Second Embodiment

Figure 12:
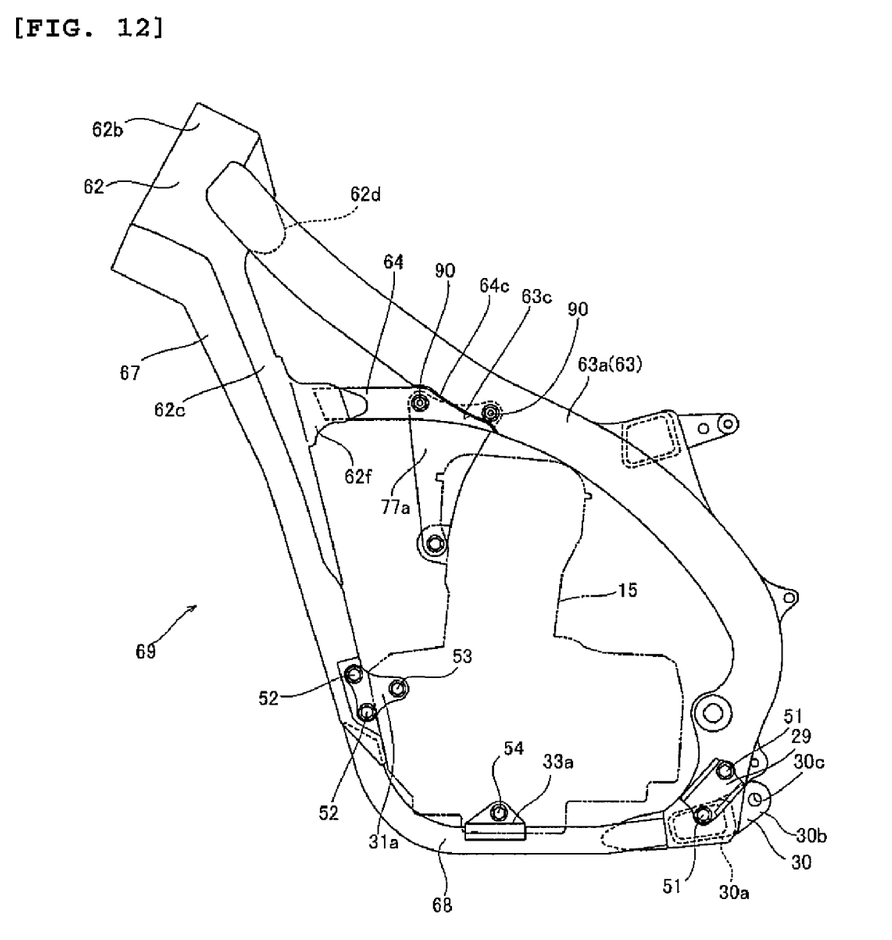
FIG. 12 is a side view of a body frame of a motorcycle according to a second embodiment of the present invention.
Figure 13:
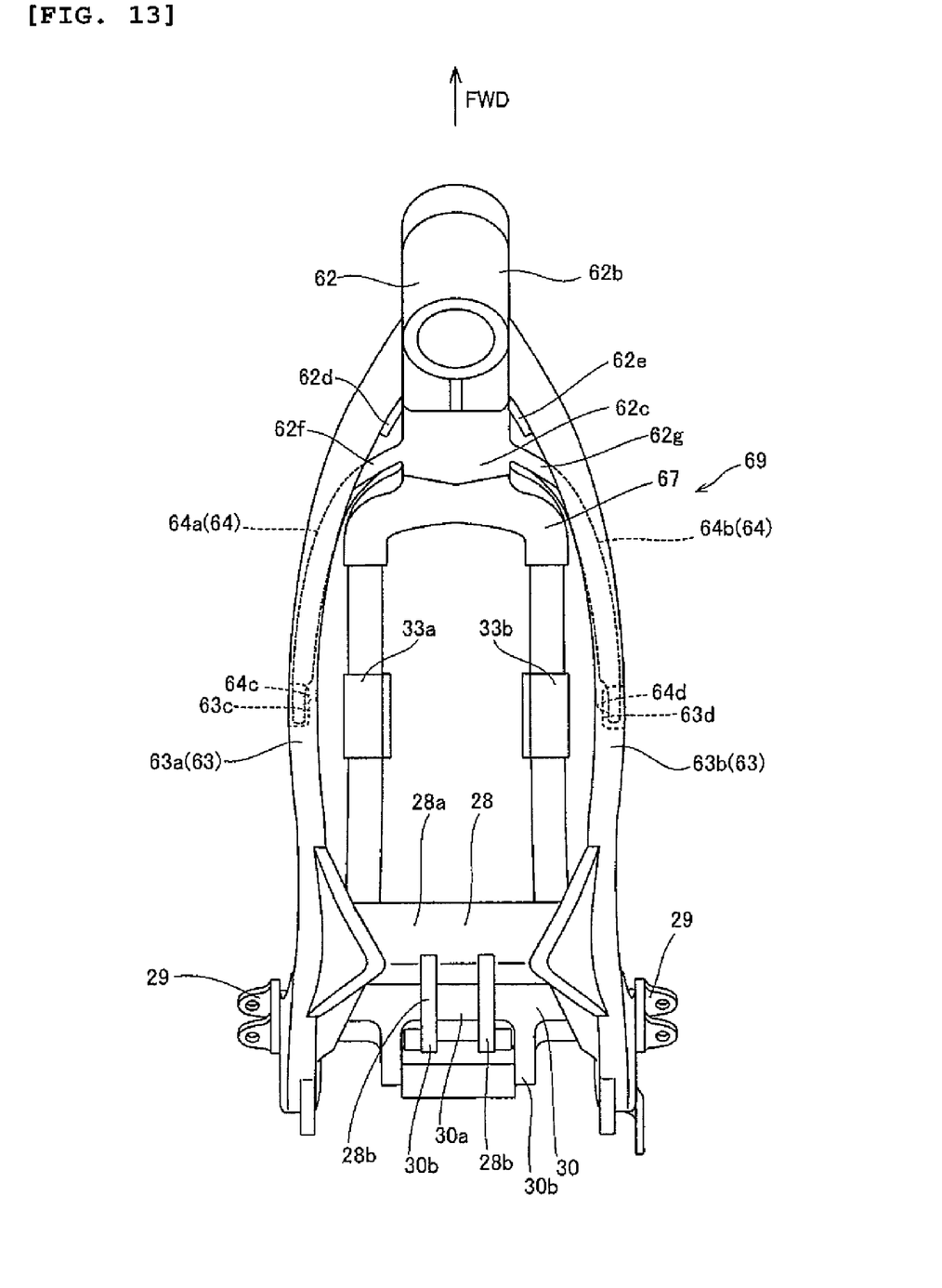
FIG. 13 is a plan view of the body frame of FIG. 12.

FIGS. 12 and 13 are explanatory views of a body frame of a motorcycle according to a second embodiment of the present invention. In the second embodiment, in contrast to the first embodiment, the front end of main frame 63 is connected directly to the rear section of cylindrical part 62b of head pipe 62.

As shown in FIG. 12 the front end of main frame 63 is directly connected to head pipe 62. Main frame 63 extends in a downwardly rearward direction and is an example of the "first frame" of the present invention.

Reinforcement member 64 is interposed between the rear of head pipe 62 and main frame 63. A front (one) end of reinforcement member 64 is connected to a part of head pipe 62 lower than the part where main frame 63 is connected, and a rear (other) end of reinforcement member 64 is connected to a middle part of main frame 63. Reinforcement member 64 is an example of the "second frame" of the present invention. A down tube 67 is disposed under head pipe 62. A lower frame 68 connects a lower end of down tube 67 and the lower end of main frame 63. Body frame 69 comprises head pipe 62, main frame 63, reinforcement member 64, down tube 67, lower frame 68, a seat rail (not shown), and a backstay (not shown).

Main frame 63 is formed of aluminum by semi-solid die-casting and comprises a left frame 63a and a right frame 63b.

Left and right frames 63a and 63b extend rearward with a predetermined spacing in a vehicle width direction viewed. Front ends of left and right frames 63a and 63b are welded to weld reinforcements 62d and 62e formed in a rear section of cylindrical part 62b of head pipe 62. Weld reinforcements 62d and 62e are an example of the "frame fixing portion" of the present invention.

As shown in FIG. 12, support plates 77a supporting engine 15 are fixed by screws 90 in the vicinity of the part where reinforcement member 64 of left frame 63a and right frame 63b is connected.

Reinforcement member 64 is formed of aluminum by extrusion and comprises a left reinforcement member 64a and a right reinforcement member 64b. As shown in FIG. 12, a front end of left reinforcement member 64a is welded to head pipe 62 at a lower left portion of body section 62c and at welded section 62f. Connecting part 64c on the rear end of left reinforcement member 64a is welded to connecting part 63c of left frame 63a. As shown in FIG. 13, a front end of right reinforcement member 64b is welded to the lower right of body section 62c of head pipe 62 and welded section 62g. At the same time, connecting part 64d of the rear end of right reinforcement member 64b is welded to connecting part 63d of right frame 63b.

Other configurations of the second embodiment are same as those of the first embodiment.

In the second embodiment, as described above, one end of reinforcement member 64 is connected to a lower part of head pipe 62 than that to which main frame 63 is connected. The relation between main frame 63 and the lower part of head pipe 62 is thereby reinforced, and the rigidity of main frame 63 is improved.

In the second embodiment, as described above, the other end of reinforcement member 64 is connected to a lower part of main frame 63. The relation between main frame 63 and the lower part of head pipe 62 is thereby reinforced, and the rigidity of main frame 63 is improved.

The embodiments disclosed herein are illustrative only and do not impose any limitation. The scope of the present invention is defined by the scope of the claims rather than by the descriptions of the embodiments, and includes all modifications falling within the scope of the invention and equivalents thereof.

For example, an application of the present invention to a motorcycle has been described. However, the present invention is not limited thereto, and can be applied to other vehicles such as automobiles, bicycles, tricycles, and ATVs (all terrain vehicles).

The main frame has been described as being directly connected to the head pipe. However, the present invention is not limited thereto, and the weld part (frame fixing portion) may be formed separately from the head pipe and the main frame may be connected to the head pipe via the weld part.

The head pipe and the main frame have been described as being formed by semi-solid die-casting. However, the present invention is not limited thereto, and the head pipe and the main frame may be formed by a process other than semi-solid die casting, such as forging and common die-casting.

The rear suspension bracket has been described as being formed by a cross pipe formed by extrusion with the mounting parts welded thereto. However, the present invention is not limited thereto, and the rear suspension bracket may instead be formed by semi-solid die-casting. This allows simultaneously forming the cross pipe and the mounting parts.

The head pipe and the main frame have been described as having a C-shaped cross section. However, the present invention is not limited thereto, and the head pipe and the main frame may be formed not to have a C-shaped cross section.

The fuel tank has been described as supported by the tank rail (second frame) connected to the head pipe and to the main frame. However, the present invention is not limited thereto, and the fuel tank may be supported by the main frame (first frame).

The main frame (first frame) has been described as being integrally formed to extend rearward and downward from the head pipe to the pivot shaft. However, the present invention is not limited thereto, and the head pipe side and pivot shaft side of the main frame can be formed separately. It is preferable at this time to set the connecting part for the main frame on the head pipe side and the main frame on the pivot shaft side, between the backstay mounting part and the fixing part for fixing the pivot shaft.

The invention claimed is:

1. A body frame comprising:
a head pipe arranged to receive a steering shaft therein, the head pipe including a cylindrical portion and a body section, the cylindrical portion arranged to surround the steering shaft and the body section arranged to extend downward and rearward from the cylindrical portion;
a first frame connected to the head pipe and supporting a rear arm to which a rear wheel is attached, the first frame including a left frame and a right frame each directly connected to and branching from the cylindrical portion of the head pipe;
a second frame connected at one end only to the body section of the head pipe and at the other end to the first frame;
a down tube including one end defining a lower section of the cylindrical portion of the head pipe and arranged to extend downward and rearward from the head pipe to a location lower than a lowermost end of the body section of the head pipe, the one end of the down tube arranged to surround the steering shaft; and
a support plate connected to the second frame and arranged to support a top end of an engine; wherein
the body section of the head pipe extends downward and rearward along at least a portion of the down tube.

2. The body frame according to claim 1, wherein the body section of the head pipe includes a frame fixing portion, at which the first frame is connected to the body section of the head pipe.

3. The body frame according to claim 1, wherein the support plate is directly connected to the first frame.

4. The body frame according to claim 1, wherein the head pipe has an insertion hole, into which the steering shaft is to be inserted, and a first recess with a depth extending in the same direction as the insertion hole.

5. The body frame according to claim 1, wherein the one end of the second frame is connected to a portion of the body section of the head pipe that is lower than a portion of the head pipe to which the first frame is connected.

6. The body frame according to claim 5, wherein the other end of the second frame is connected to a middle portion of the first frame.

7. The body frame according to claim 1, wherein at least one of the head pipe and the first frame has a C-shaped cross section.

8. The body frame according to claim 1, wherein the left and right frames extend rearward with a predetermined spacing therebetween and approach each other toward the head pipe.

9. The body frame according to claim 1, wherein at least one of the first frame and the head pipe is formed by semi-solid die casting.

10. A vehicle comprising the body frame of claim 1.

11. The vehicle according to claim 10, wherein the vehicle is a motorcycle.

12. A vehicle comprising:
a rear wheel;
a rear arm to which the rear wheel is attached;
a head pipe including a cylindrical portion arranged to receive a steering shaft therein;
a first frame connected to the head pipe and supporting the rear arm, the first frame including a left frame and a right frame directly connected to and branching from the cylindrical portion of the head pipe;
a second frame connected at one end only to the head pipe and at the other end to the first frame;
a down tube including one end defining a lower section of the cylindrical portion of the head pipe and arranged to extend downward and rearward from the head pipe to a location lower than a lowermost end of any portion of the head pipe, the one end of the down tube arranged to surround the steering shaft; and
a support plate connected to the second frame and to a top end of an engine; wherein
the head pipe extends downward and rearward along at least a portion of the down tube.

13. The vehicle according to claim 12, further comprising a fuel tank that is supported by the second frame.

14. A motorcycle comprising:
a rear wheel;
a head pipe including a cylindrical portion arranged to receive a steering shaft therein;
a main frame directly connected to the head pipe and supporting a rear arm to which the rear wheel is attached, the main frame including a left frame and a right frame directly connected to and branching from the cylindrical portion of the head pipe;
a second frame connected at one end only to the head pipe and at the other end to the main frame;
a down tube including one end defining a lower section of the cylindrical portion of the head pipe and arranged to extend downward and rearward from the head pipe to a location lower than a lowermost end of any portion of the head pipe, the one end of the down tube arranged to surround the steering shaft; and
a support plate connected to the second frame and to a top end of an engine; wherein
the head pipe extends downward and rearward along at least a portion of the down tube.

15. The motorcycle according to claim 14, wherein the second frame is a reinforcement member connected at the one end to a portion of the head pipe that is lower than a portion of the head pipe to which the main frame is connected, and at the other end to a middle portion of the main frame.

16. The body frame according to claim 1, further comprising a lower frame directly connected at one end to a lower end of the down tube and directly connected at another end to a lower end of the first frame.

17. The body frame according to claim 1, wherein the body section of the head pipe extends downward and rearward along the down tube to a point lower than a point where the second frame is connected to the head pipe.

18. The body frame according to claim 1, wherein the down tube includes a support plate arranged to support a front end of the engine.

* * * * *